Figure 19:
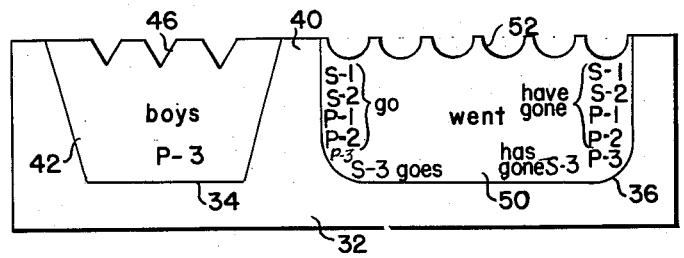
Figure 20:
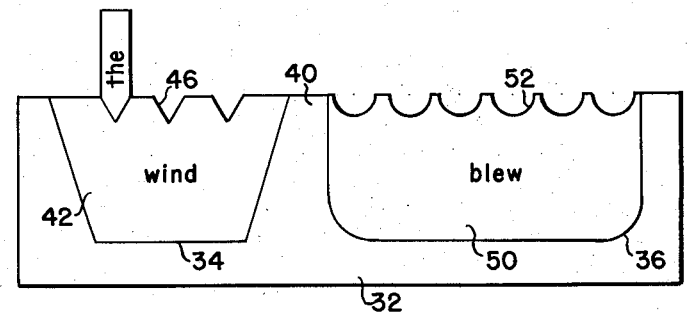
Figure 21:
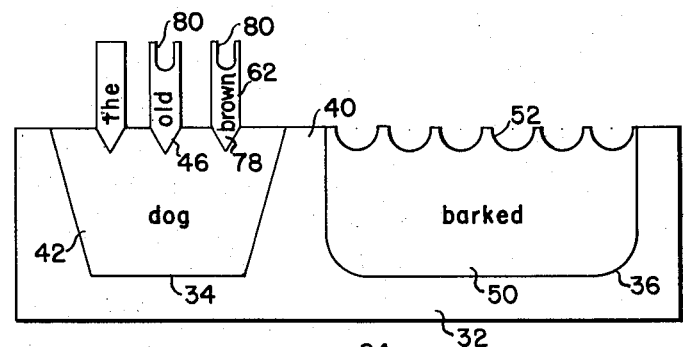
Figure 22:
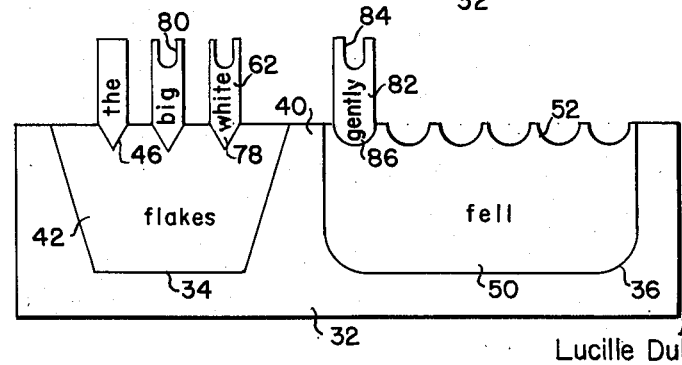
Figure 23:
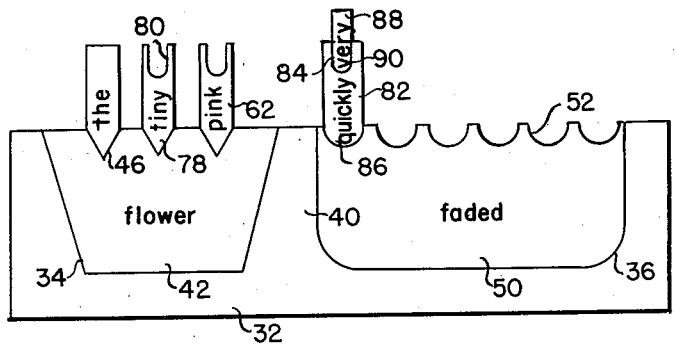
Figure 24:
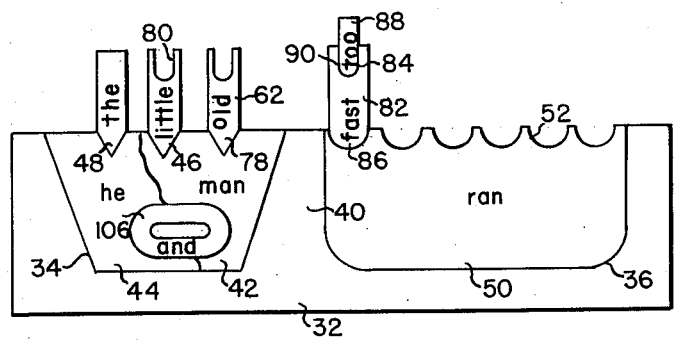
Figure 25:
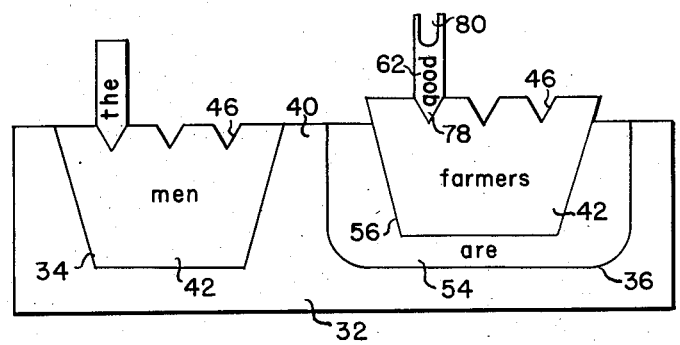
Figure 26:
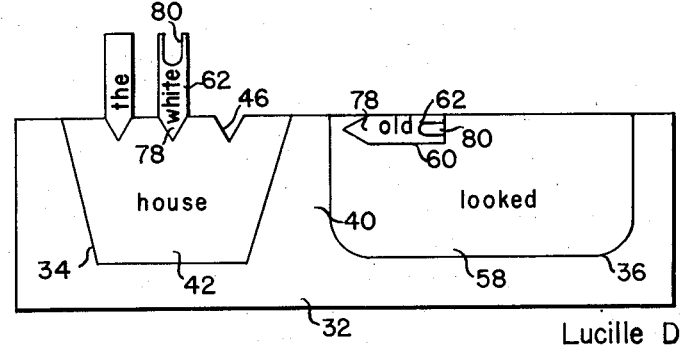
Figure 27:
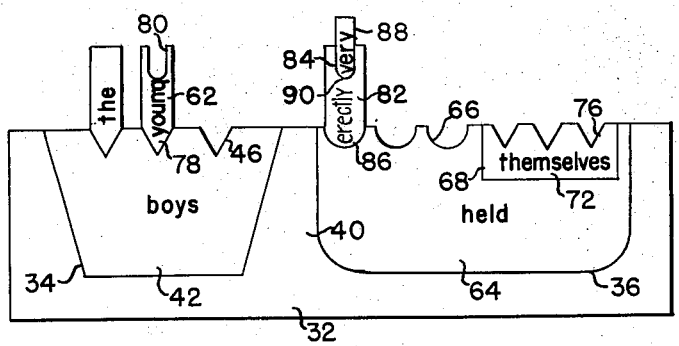
Figure 28:
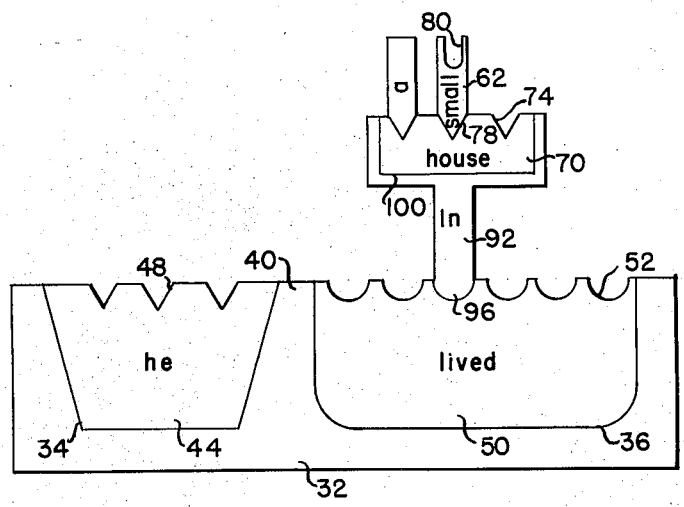
Figure 29:
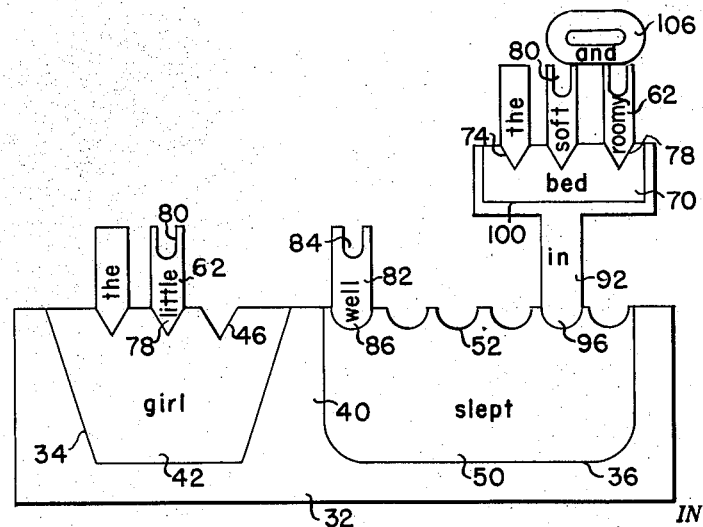

Aug. 29, 1950 L. D. NORTHROP 2,520,649
GRAMMAR GAME
Filed April 23, 1947 5 Sheets-Sheet 1
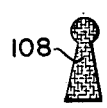 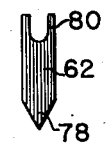 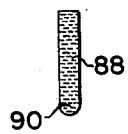 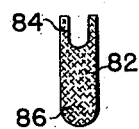 
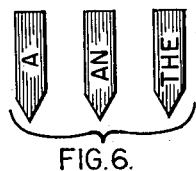 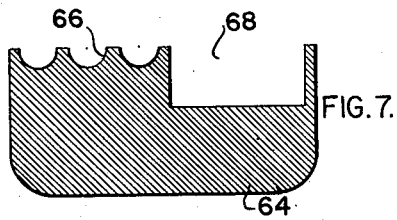 
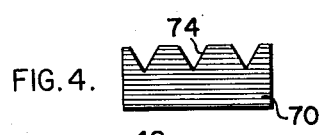
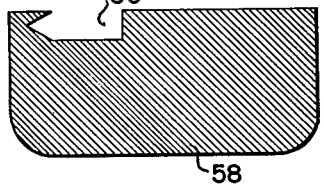
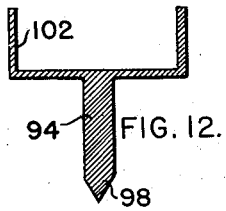
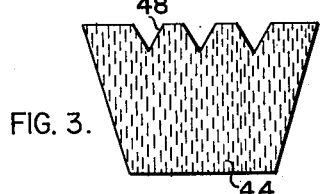
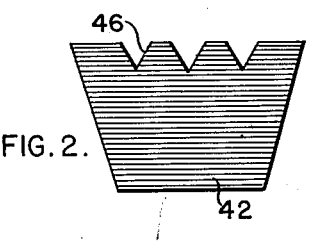 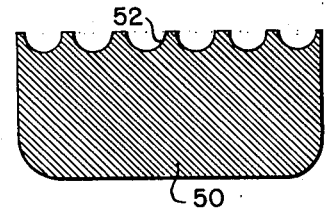 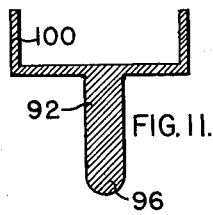
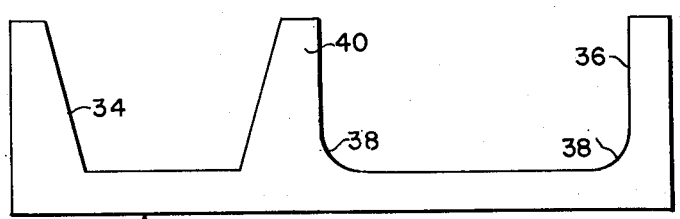
INVENTOR.
Lucille Duke Northrop
BY
ATTORNEY INVENTOR.
Lucille Duke Northrop Aug. 29, 1950 — L. D. NORTHROP — 2,520,649
GRAMMAR GAME Filed April 23, 1947 — 5 Sheets-Sheet 3

INVENTOR.
Lucille Duke Northrop
BY
ATTORNEY

Aug. 29, 1950 L. D. NORTHROP 2,520,649
GRAMMAR GAME
Filed April 23, 1947 5 Sheets-Sheet 4

INVENTOR.
Lucille Duke Northrop
BY
Attorney

Aug. 29, 1950 L. D. NORTHROP 2,520,649
GRAMMAR GAME
Filed April 23, 1947 5 Sheets-Sheet 5
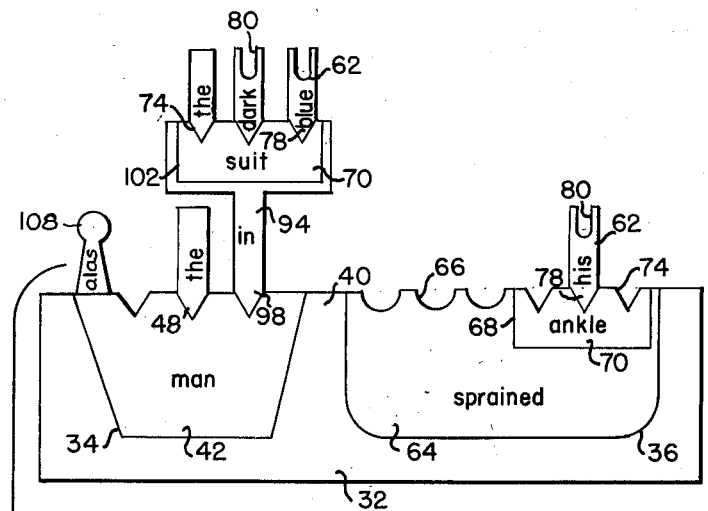
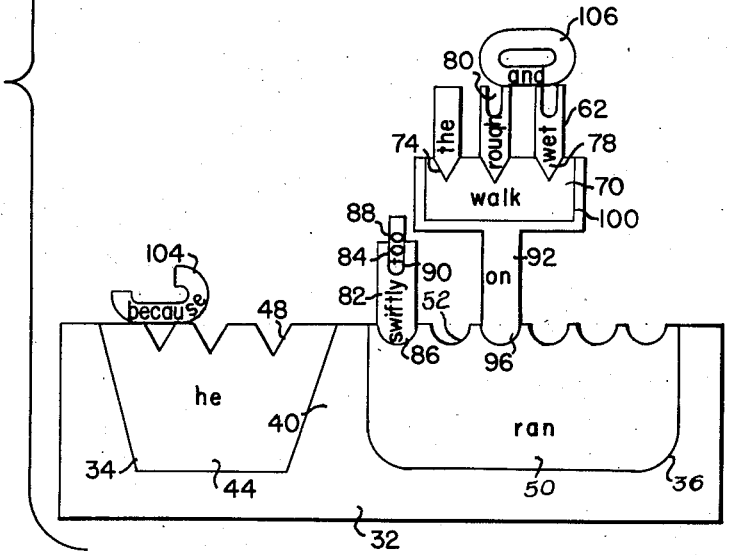
FIG. 30.
INVENTOR.
Lucille Duke Northrop
BY
Attorney Patented Aug. 29, 1950

2,520,649

UNITED STATES PATENT OFFICE 2,520,649

GRAMMAR GAME

Lucille D. Northrop, Mankato, Minn.

Application April 23, 1947, Serial No. 743,241

6 Claims. (Cl. 35—35)

The present invention relates generally to the field of education and more particularly to an improved method and apparatus for facilitating the study of grammar.

The principal object of the invention is to develop in a student independent ability in constructing correct grammatical sentences by providing a plurality of individual elements representing different words which may be assembled in accordance with a prearranged plan and which are structurally related to the various parts of speech in such manner that they may only be assembled in correct syntactical arrangements.

Another object of the invention is to provide grammar study apparatus of the general type described which may be readily employed in various games for the purpose of mere entertainment as well as for sustaining student interest during serious study.

A further object of the invention is to provide apparatus of the type described wherein certain of the playing elements include indicia of person and of number which may be readily matched with similar indicia upon other elements to indicate grammatical agreement.

Yet another object of the invention is to provide a method of studying grammar combining a visual and tactual approach wherein the various playing elements are distinctive both intrinsically, as by reason of characteristic shape, color, or the like, and functionally, as by notches, grooves, or contour, to insure correct interfitting.

An additional object of the invention is to provide an instructive game of the general type described which will be of particular utility in connection with the teaching of children by reason of its colorful and attractive nature.

Other objects and advantages of the invention will become apparent during the course of the following description.

In the drawings I have shown one embodiment of the invention. In this showing

Figs. 1 to 18, inclusive, are plan views respectively illustrating preferred forms of sentence base structure and various characteristic parts of speech playing elements embodying distinctive colors and interengaging portions adapted for assembly in accordance with the principles of the present invention; and Figs. 19 to 30, inclusive, are plan views respectively illustrating twelve different assemblies of the game elements of Figs. 1 to 18, inclusive, corresponding to twelve different rounds of a typical game in accordance with the invention.

Referring now in more detail to the various figures of the drawings, the individual playing elements selected for purposes of illustration in Figs. 1 to 18 inclusive, are of a tangible character and may be typically formed of cardboard, wood, metal, plastics, or the like. Each of the elements is relatively flat and thin and as will be noted from the cross-hatching of Figs. 1 to 18 is preferably provided with a characteristic color for ready identification. For the sake of clarity this crosshatching has been omitted from Figs. 19–30, inclusive, and for the same reason the words of Figs. 19 to 30 have been omitted from the element forms of Figs. 1 to 18, although it will be understood that in actual practice each individual element is provided both with a distinctive color and a specific word designation and where appropriate also includes indicia of person and number as illustrated in Fig. 19. It will also be apparent that the various elements may, if desired, be of substantial thickness and have the general appearance of a set of building blocks.

The base of the sentence is illustrated in Fig. 1 and is designated generally by reference numeral 32. This element does not in itself constitute a part of speech but is employed merely as a foundation upon which the various elements may be built into complete sentence forms. To this end the base 32 is provided with two cutaway portions 34 and 36, respectively, the cutaway portion 34 being generally trapezoidal in shape with straight sides intersecting to form sharp angles and the cutaway portion 36 being roughly rectangular but having pronounced rounded corners 38 giving this portion somewhat the appearance of a boat. The two portions 34 and 36 representing the major sentence divisions are separated by a central wall 40 and are respectively adapted to contain the subject and predicate of a sentence. As indicated in Fig. 1, the base of the sentence is white although it may be given a distinctive color if desired in order that it may be even more readily distinguished from the playing elements.

Since the portion 34 of the base 32 is adapted to receive a word constituting the subject of the sentence, it is accordingly constructed so as to properly receive only an element representing a noun or a pronoun in the nominative case. Figs. 2 and 3, respectively, illustrate elements 42 and 44 constituting a noun and a pronoun in the nominative case and it will be noted that the trapezoidal or keystone shape of these elements is such that either may be engaged within the space 34 completely filling the latter. In addition to the fact that each of the noun and pronoun elements 42 and 44 will normally be provided with a word designation upon its face, these elements are preferably of different color for easy identification. It will also be noted that the top edges of both noun and pronoun elements 42 and 44 are serrated or provided with a plurality of V-shaped notches 46 and 48, respectively, for a reason which will hereinafter be more fully explained. Other than the differences in the words designated and the colors, the elements 42 and 44 are identical in size and shape in accordance with the general rule or definition that a pronoun takes the place of a noun and accordingly may be substituted therefor in a properly constructed sentence provided the proper case is employed.

As mentioned above, the predicate of the sentence is adapted to be constructed upon the portion 36 at the right-hand side of the base 32 which accordingly can properly engage and be filled only by one of the similarly shaped forms indicated in Figs. 7, 8, 9, and 10. Thus each of the elements illustrated in Figs. 7-10 represents a verb form to be described in detail below and is provided with an external contour enabling it to fill the cutaway portion 36.

As shown in Fig. 10, the element 50 represents a complete verb which may be either transitive or intransitive in form and which in either case completely fills the space 36 constituting the predicate. The element 50 represents an action verb and is transitive if the subject is acted upon and intransitive if the subject does the acting. It will also be noted that the top edge of the element 50 is scalloped or provided with a plurality of evenly spaced grooves 52, the sides of which are smoothly curved in contrast to the straight intersecting sides of the notches 46 and 48 of the noun and pronoun elements 42 and 44 illustrated in Figs. 2 and 3. The complete verb may either show action or a state of being but in any case its concrete representation must completely fill the predicate space 36.

The element illustrated in Fig. 9 and designated by reference numeral 54 constitutes an alternative verb form to that illustrated in Fig. 10. The element 54 however, represents an incomplete verb of the linking or copulative type involving no action and is always intransitive. It will be noted that the element 54 does not completely fill the predicate space 36 to the extent that it is provided with a cutaway portion 56 identical in shape to the cutaway portion 34 which latter is adapted to receive the subject in the sentence space 32. The space 56 accordingly can be filled only by a noun or pronoun in the nominative case as represented by either of the elements 42 or 44 so that in order to provide a complete predicate the incomplete verb form represented by element 54 must include such a noun or pronoun in the nominative case constituting a predicate nominative.

A third predicate modification is illustrated in Fig. 8, wherein an element 58 is shown as having a similar external contour to that of the elements 50 and 54 previously described. The element 58 also represents a verb form which is incomplete and of the linking or copulative type involving no action and is always intransitive. It will be noted that the element 58 also includes a cutaway portion 60 at its upper left corner having a characteristic shape which preferably takes the form of a rectangle having a sharp pointed end. It will thus be apparent that the element 58 does not ecompletely fill the predicate which can only be completed by the addition of another word element to fill the space 60. The element which fills the space 60 is designated by reference numeral 62 in Fig. 17 and constitutes the concrete representation of an adjective which is called a predicate adjective when used to fill the space 60.

The fourth verb modification is illustrated in Fig. 7, and is represented by an element 64 having the characteristic outline of the predicate form. The element 64 represents an incomplete action verb of the type which is always transitive and includes a plurality of notches 66 along its upper edge having curved sides similar to the notches 52 of the verb element 50 illustrated in Fig. 10. It will be noted, however, that the element 64 does not completely fill the predicate by reason of a rectangular cutaway portion 68 in its upper right-hand corner. The verb element 64 can only constitute a complete predicate when the space 68 is filled in by a noun or pronoun in the objective case which is called a direct object.

The elements respectively designating a noun and a pronoun in the objective case are illustrated in Figs. 4 and 5 and are designated by reference numerals 70 and 72. It will be noted that the elements 70 and 72 embody the same characteristic colors as the respective elements 42 and 44 representing nouns and pronouns in the nominative case, the exterior contour being varied to indicate the case difference which controls correct usage. The elements 70 and 72 are also provided with a plurality of straight sided notches 74 and 76, respectively, along their upper edges similar to the notches 46 and 48 in the elements 42 and 44. Since by abstract definition a noun is a word that names a person, place or thing, and a pronoun is the word that takes the place of a noun, the physical embodiments thereof are identical with the exception of the distinguishing colors and the two modifications representing the nominative and objective cases of each are provided so that only the nominative case may be used in the subject.

The characteristic shape of the element 62 representing the adjective form as illustrated in Fig. 17 has already been described as generally that of a rectangle having one end pointed as indicated by reference numeral 78 in Fig. 17. By its abstract definition an adjective is a word that points out a noun or pronoun by telling which one, what kind, or how many, and accordingly it will be seen that the pointed end 78 is so shaped that the element 62 can only be properly engaged with one of the notches 46, 48, 74 or 76 or, in other words, the adjective can only be used with a noun or pronoun in either the nominative or objective case. At its top end the adjective element 62 is provided with a relatively narrow rounded groove 80 for a purpose which will hereinafter be more fully explained.

Referring specifically to Fig. 6 there are illustrated three special forms which are quite similar to the adjective elements 62. These elements in Fig. 6 as indicated by the words written thereon designate the articles which constitute a special type of adjective. Since the articles "a," "an," and "the" are actually adjectives they are accordingly represented by similarly shaped elements although it will be noted that no grooves are provided in the upper edges of the article elements as in the case of the adjective element 62.

In Fig. 15 there is illustrated an element 82 quite similar to the adjective element 62, having a curved notch 84 at its upper edge similar to the notch 80 but having its bottom portion formed as a smoothly curved contour designated by reference numeral 86 instead of the sharp pointed end 78 of the adjective element 62. The element 82 represents an adverb which by abstract definition is generally employed to round out the meaning of a verb by telling how, when, or where. It is to be particularly noted that the smoothly curved end 86 is so contoured that it can only be properly engaged within one of the curved notches 52 or 66 of the elements 50 and 64, respectively, or, in other words, the adverb can only be used with a verb.

Referring to Fig. 16, there is illustrated an element 88 generally similar to the element 82 and representing a modified form of adverb of the type employed to round out an adjective or another adverb by telling, for example, how much or to what degree. It will be noted that the bottom end 90 of the element 88 is formed in a smoothly rounded contour similar to the bottom end 86 of the adverb element 82 but of smaller dimensions so that it can only be properly engaged within one of the smoothly curved notches 80 or 84. Thus the modified adverb element 88 can only be used with an adjective or another adverb.

Figs. 11 and 12 illustrate two elements 92 and 94 respectively representing modified forms of prepositions. By abstract definition a preposition is a word showing the relation between a noun or a pronoun and some other word in the sentence and is commonly used to introduce a phrase or group of words used as a single part of speech. The preposition may thus be used with either a noun, pronoun, or verb, and accordingly the element 92 is provided with a rounded end 96 adapted to be properly engaged with one of the grooves 52 or 66 and the element 94 is provided with a pointed end 98 adapted for similar engagement within one of the pointed grooves 46, 48, 74, or 76. In any event the preposition must be followed by a noun or pronoun in the objective case and accordingly the elements 92 and 94 are provided with openings 100 and 102, respectively, of generally rectangular shape and adapted to receive only one of the elements 70 or 72. It is to be noted in both Figs. 11 and 12 that the elements 92 and 94 representing prepositions are generally of the same shape being characteristically of a T-formation.

Referring now to Figs. 13 and 14, there are illustrated two elements 104 and 106 respectively representing two different modifications of the part of speech known as the "conjunction." By its abstract definition a conjunction is a linking word and in the two modifications illustrated is shown as either a complete ring or torus as in Fig. 14 or a partial ring as in Fig. 13, the former representing a coordinate conjunction and the latter representing a subordinate conjunction. The coordinate conjunction is shown as a complete ring since it can only be employed to join words or word elements of identical shape and the subordinate conjunction is not employed in simple sentences so that it is not represented as a complete ring. Thus the coordinate conjunction may link two adverbs, two adjectives, two nouns, two pronouns, or a noun and a pronoun both of which are in the same case.

In Fig. 18 there is illustrated an element 108 roughly similar in shape to an exclamation point and representing the part of speech known as the interjection. By its abstract definition an interjection is a word that expresses strong feeling or emotion and may be employed in various positions or arrangements in a sentence. Thus the element 108 is not provided with any characteristic contour adapted to fit in assembly with other words in the sentence since the interjection actually has no structural relation to any other part of speech in the sentence.

From the foregoing description it will now be apparent that each of the elements illustrated in Figs. 2 to 18, inclusive, is provided with some distinctive characteristic feature which readily identifies the part of speech under which the word which the element represents is normally classified. In addition to the readily identifiable character of the various elements it will also be noted that each is so constructed that it can be assembled with various other elements only in correct syntactical arrangements. In order to illustrate the principles of the invention still further there is described below a typical game in which the various parts of speech elements may be employed.

The object of the game is to build correct grammatical sentences by assembling the various elements together in proper relationship. Any number of players may participate in the game and they will be seated about a table or other playing area in such manner that the play may progress in turn to the left in a clockwise fashion unless otherwise directed.

The game is played in rounds arranged in such manner that successive rounds represent logical developments in the building of sentences and become increasingly complex as the game progresses. The number of playing elements required must necessarily vary for each round as the different parts of speech are added to make the sentences increasingly complex and of course there must be a limit to the number of words represented by playing elements so that any reasonable number of different words may be used.

Preferably certain of the players are designated as officials of the game although non-players may be so chosen if desired. A referee is chosen to render a decision in case of disagreement among the players as to the meaning of any particular sentence. The test in every case is whether or not the sentence makes sense and if challenged, a player must justify the meaning of the words represented by the assembled elements. The referee's decision cannot be challenged so that the particular element cannot be eliminated from the construction of a given sentence subsequent to the referee's decision that it is playable. In addition to the referee a scorer is ordinarily provided to keep the point scores and a scribe to write out the sentences when necessary.

The scoring value of each of the various parts of speech is as follows:

| Parts of speech | Scoring value |
| --- | --- |
| Noun | 10 |
| Verb | 10 |
| Pronoun | 10 |
| Adjective | 5 |
| Adverb | 5 |
| Preposition | 3 |
| Conjunction | 2 |
| Interjection | 1 |

The game is played in twelve rounds of increasing complexity, as outlined below, wherein the element or elements introduced in each round have been underscored.

SUMMARY OF ROUNDS AND PARTS OF SPEECH USED IN EACH

*Round I*

Nouns P-3 (nominative case)
Verbs (complete)
Sentence composed of one noun and one verb.
Sentence scoring value_____20

Round II
Adjectives (article)
Nouns S-3 (nominative case)
Verbs (complete)
Sentence composed of one noun, one verb, one adjective.
Sentence scoring value_____ 25

Round III
Adjectives (article, descriptive)
Nouns P-3, S-3 (nominative case)
Verbs (complete)
Sentence composed of one noun, one verb, three adjectives.
Sentence scoring value_____ 35

Round IV
Adverbs (time, place, manner)
Nouns P-3, S-3 (nominative case)
Verbs (complete)
Adjectives (article, descriptive)
Sentence composed of one noun, one verb, three adjectives, one adverb.
Sentence scoring value_____ 40

Round V
Adverbs (time, place, manner, degree)
Nouns P-3, S-3 (nominative case)
Verbs (complete)
Adjectives (article, descriptive)
Sentence composed of one noun, one verb, three adjectives, two adverbs.
Sentence scoring value_____ 45

Round VI
Pronouns P-3, S-3 (nominative case)
Nouns P-3, S-3 (nominative case)
Verbs (complete)
Adjectives (articles, descriptive)
Adverbs (time, place, manner, degree)
Sentence composed of one noun, one verb, three adjectives, two adverbs, one pronoun.
Sentence scoring value_____ 55

Round VII
Verbs (incomplete, requiring predicate nominative)
Nouns P-3, S-3 (nominative case)
Pronouns P-3, S-3 (nominative case)
Adjectives (articles, descriptive)
Sentence composition varies with the game.
Sentence scoring value varies with the game.

Round VIII
Verbs (incomplete, requiring predicate adjective)
Nouns P-3, S-3 (nominative case)
Pronouns P-3, S-3 (nominative case)
Adjectives (article, descriptive)
Sentence composition varies with the game.
Sentence scoring value varies with the game.

Round IX
Verbs (incomplete, requiring direct object)
Nouns and pronouns P-3, S-3 (nominative case)
Nouns and pronouns (objective case)
Adjectives (articles, descriptive)
Adverbs (time, place, manner, degree)
Sentence composition varies with the game.
Sentence scoring value varies with the game.

Round X
Prepositions
Nouns and pronouns P-3, S-3 (nominative case)
Nouns and pronouns (objective case)
Verbs (complete)
Adjectives (articles, descriptive)
Sentence composition varies with the game.
Sentence scoring value varies with the game.

Round XI
Conjunctions
Nouns and pronouns P-3, S-3 (nominative case)
Nouns and pronouns (objective case)
Verbs (complete)
Adjectives (articles, descriptive)
Adverbs (time, place, manner)
Prepositions
Sentence composition varies with the game.
Sentence scoring value varies with the game.

Round XII
Interjections
All other parts of speech
Sentence composition varies with the game.
Sentence scoring value varies with the game.

Typical sentences constructed in accordance with the twelve rounds above are illustrated respectively in Figs. 19–30 of the drawings and the following is a typical playing procedure for Round I: Referring to the definition of Round I in the summary, it will be noted that the object of this round is to construct a sentence composed of one noun in the nominative case and one complete verb. Accordingly, all the elements 42 representing nouns in the nominative case are placed in a pile face down upon the table. All of the complete verb elements 50 are similarly placed in a separate pile also face down on the table. Each player is provided with a sentence base element 32 and draws in turn from the two piles. As an element is drawn, the player attempts to fit it into the base element 32 to form a complete sentence under the round definition and if the subject and predicate do not agree or make sense, then the element cannot be played and the player must drop out of the game. If a complete sentence is formed, the player continues in the game and the elements continue to be drawn in order by the various players around the table substituting nouns and verbs alternately until all of the players except one have been forced out of the game. Thus if at any stage of the game a player fails to draw a part which makes sense and thus constitutes a sentence, he must return the part to its proper center pile and drop out of the game. When only one player is left in the game, he is the winner and the scores are then totaled, counting ten points for each noun and each verb in the player's possession at the end of the game. Where only two or three people are playing, the game may be won on the basis of the first player to score an arbitrary number of points.

A typical sentence under Round I is illustrated in Fig. 19 which may be read as follows: "Boys went." Sentences constructed by the same procedure in accordance with the other rounds of the game are illustrated in Figs. 20–30, inclusive, wherein the additional part of speech underlined in the preceding summary of rounds has been added in each example and may be read as follows:

Round II, "The wind blew."
Round III, "The old brown dog barked."
Round IV, "The big white flakes fell gently."
Round V, "The tiny pink flower faded very quickly."
Round VI, "He and the little old man ran too fast."
Round VII, "The men are good farmers."
Round VIII, "The white house looked old."
Round IX, "The young boys held themselves very erectly."
Round X, "He lived in a small house."

Round XI, "The little girl slept well in the soft and roomy bed."

Round XII, "Alas, the man in the dark blue suit sprained his ankle because he ran too swiftly on the rough and wet walk."

Referring now particularly to Fig. 19, it will be noted that the elements 42 and 50 include a number of additional markings thereon comprising several additional words in the case of the verb element 50 and in each case including various indicia of person and number. The notation is quite simple, consisting merely of the letters "S" and "P" designating singular and plural respectively, together with the numbers 1, 2 and 3, respectively, designating first, second and third person. Where the verb element 50, as in the case illustrated in Fig. 19, represents the past tense of a verb, that form is free and accordingly has no identification number but is located in a central position on the element. Thus in Fig. 19, "went" is in the past tense and will agree with its subject regardless of what the latter may be. However, it will be noted in Fig. 19 that the subject "Boys" is designated as third person plural, the corresponding form of which is indicated upon the verb element 50 for the present and present perfect tenses including the correct form of the auxiliary verb "has" or "have." Thus the sentence of Fig. 19 may be read using the free form of the verb (past tense) as "Boys went." and, matching indicia, may also be read as "Boys go." and "Boys have gone."

From the above it will be apparent that the game elements of the present invention also provide training in application of the grammatical rule of agreement between verb and subject by the provision of indicia which may be readily matched. Although such indicia are shown only upon the elements in Fig. 19, it is to be understood that similar indicia are provided upon every such element so that skill in recognition and correct usage of the present, past and present perfect tense is provided by the appearance of these three tenses on every verb part. In order to lend interest to the game it is contemplated that a bonus of say ten points will be given to the player in addition to his regular point score as a reward for properly matching subject and predicate in the various sentences of the rounds in such manner that the sentence may be read using these tenses.

It will be noted that the verb elements do not indicate the correct usage of the present perfect, past perfect and future perfect tenses as the elements do not provide sufficient space to contain this information. However, the most common verb errors are found either as errors in agreement such as "We was" instead of "We were" or confusion of the past and perfect tenses such as "I seen" for "I saw" and "I have went" for "I have gone." Glaring errors in agreement ordinarily do not occur in the future tense and such errors as may occur in the past perfect tense will be automatically eliminated in connection with the establishment of correct present perfect forms.

Although the game described above and played as a process of elimination is preferred as a study method involving the use of my improved part of speech elements, it will be apparent that numerous other games embodying these same elements may be readily devised. For example, another such game might be played in the form of a quiz program in which the players in turn act as quiz masters. Thus taking Round I, for example, the quiz master would draw a noun and a verb, place them in position in the base element, and read them. If the elements constitute a complete sentence, the quiz master then questions the player at his left by asking him to give the sentence using the verb forms having identification numbers matching that of the noun in the subject. The quiz master may then draw another noun and verb and question each of the remaining players in turn continuing as long as he can draw nouns and verbs which make sense and thus constitute complete sentences.

If at any time the quiz master fails to make a complete sentence, his office passes to the next player at the left and the game ends when each player has been quiz master a certain number of times. The same game may of course be played for each of the twelve rounds or may be limited to simple sentence forms inasmuch as the principal object of this game is to develop skill in agreement. In playing this game each player may score five points for each correct answer when being quizzed and as quiz master may score twenty points for each sentence built and five points for each incorrect verb form given by any player questioned.

Although the foregoing description and illustration have been limited to only two games and while I have described only one round in any considerable detail, it will be obvious that the other rounds will be similarly played, using the required number of the same basic elements. It should also be noted that the use of part of speech elements in accordance with the present invention is not limited to the study of the English language as similar game sets may be provided for use in teaching other languages having regular rules of grammar and agreement. It will be further apparent that while I have illustrated preferred characteristic shapes and colors for the various part of speech elements, obviously numerous modifications, alterations, and deviations from these specific structures will occur to one skilled in the art without departing from the spirit or scope of the invention as set forth in the appended claims.

I claim:

1. A device of the character described comprising a base member provided with a pair of recesses of different conformation, a pair of primary elements respectively representing the subject and predicate of a sentence and each having a portion thereof shaped to conform to one of said recesses to be placed therein and wholly fill said recess, each of said primary elements being provided with recesses different from the recesses of the other primary element and different from the recesses in said base, and supplementary elements representing words respectively cognate to the subject and predicate of a sentence and each having a portion shaped to conform to and solely receivable in the recesses in one primary element wholly independently of said base member.

2. A device of the character described comprising a base member provided with a pair of recesses of different conformation, a pair of primary elements respectively representing the subject and predicate of a sentence and each having a portion thereof shaped to conform to one of said recesses to be placed therein and wholly fill said recess, each of said primary elements being provided with recesses different from the recesses of the other primary element and different from the recesses in said base, the recesses in each primary element being identical with each other, and a plurality of supplementary elements representing words cognate to each of the subject and predicate of a sentence, each supplementary element having a portion shaped to conform to the recesses in one of said primary elements to be solely received in one of such recesses wholly independently of said base member with the remainder of such supplementary element projecting from the associated primary element.

3. A device of the character described comprising a base member provided with a pair of recesses of different conformation, a pair of primary elements respectively representing the subject and predicate of a sentence and each having a portion thereof shaped to conform to one of said recesses to be placed therein and wholly fill said recess, each of said primary elements being provided with recesses different from the recesses of the other primary element and different from the recesses in said base, the recesses in each primary element being identical with each other, a plurality of supplementary elements representing words cognate to each of the subject and predicate of a sentence, each supplementary element having a portion shaped to conform to the recesses in one of said primary elements to be solely received in one of such recesses wholly independently of said base member with the remainder of such supplementary element projecting from the associated primary element, certain of said supplementary elements having recesses in the portions thereof projecting from the associated primary element different in contour from any of the other of said recesses, and a modifying element representing a part of speech modifying the part of speech represented by one of the recessed supplementary elements and having a portion shaped to conform to the recess in such supplementary element.

4. A device of the character described comprising a flat base member adapted to be horizontally arranged on a supporting surface and provided in edge portions thereof with a pair of recesses of different conformation cut vertically therethrough, a pair of flat primary elements respectively representing the subject and predicate of a sentence and each having portions thereof shaped to conform to one of said recesses to be placed therein and wholly fill said recess with said primary elements resting horizontally on the supporting surface, each of said primary elements being provided in an edge portion thereof with a recess extending vertically therethrough and different from each other and different from the recesses in said base, and flat supplementary elements representing words respectively cognate to the subject and predicate of a sentence and each having a portion shaped to conform to and adapted to be solely received in the recess in one of said primary elements wholly independently of said base member with such supplementary element resting on the supporting surface.

5. A device of the character described comprising a flat base member adapted to be horizontally arranged on a supporting surface and provided in edge portions thereof with a pair of recesses of different conformation cut vertically therethrough, a pair of flat primary elements respectively representing the subject and predicate of a sentence and each having portions thereof shaped to conform to one of said recesses to be placed therein and wholly fill said recess with said primary elements resting horizontally on the supporting surface, each of said primary elements being provided in an edge portion thereof with recesses extending vertically therethrough and different from the recesses of the other primary element and different from the recesses in said base, the recesses in each primary element being identical with each other, and a plurality of flat supplementary elements representing words cognate to each of the subject and predicate of a sentence, each supplementary element having an edge portion shaped to conform to each of the recesses in one of said primary elements to be solely received in one of such recesses wholly independently of said base member when such supplementary element is lying flat on the supporting surface, each supplementary element, when said portion thereof is arranged in a recess in one of said primary elements, projecting horizontally from such primary element.

6. A device of the character described comprising a flat base member adapted to be horizontally arranged on a supporting surface and provided in edge portions thereof with a pair of recesses of different conformation cut vertically therethrough, a pair of flat primary elements respectively representing the subject and predicate of a sentence and each having portions thereof shaped to conform to one of said recesses to be placed therein and wholly fill said recess with said primary elements resting horizontally on the supporting surface, each of said primary elements being provided in an edge portion thereof with recesses extending vertically therethrough and different from the recesses of the other primary element and different from the recesses in said base, the recesses in each primary element being identical with each other, a plurality of flat supplementary elements representing words cognate to each of the subject and predicate of a sentence, each supplementary element having an edge portion shaped to conform to each of the recesses in one of said primary elements to be solely received in one of such recesses wholly independently of said base member when such supplementary element is lying flat on the supporting surface, each supplementary element, when said portion thereof is arranged in a recess in one of said primary elements, projecting horizontally from such primary element, one of said supplementary elements having a recess in the portion thereof projecting from the primary element with which it is associated, said recess in such supplementary element being different in contour to any of the other of said recesses, and a flat horizontal modifying element representing a part of speech modifying the part of speech represented by the recessed supplementary element and having an edge portion shaped to conform to and to be received in the recess in such supplementary element.

LUCILLE D. NORTHROP.

REFERENCES CITED

The following references are of record in the file of this patent:

UNITED STATES PATENTS

| Number | Name | Date |
|---|---|---|
| 1,396,379 | Moore | Nov. 8, 1921 |
| 2,278,327 | Magnus et al. | Mar. 31, 1942 |
| 2,415,342 | Donner | Feb. 4, 1947 |

FOREIGN PATENTS

| Number | Country | Date |
|---|---|---|
| 433,265 | Germany | Sept. 2, 1926 |